United States Patent
Acht et al.

[11] Patent Number: 6,151,974
[45] Date of Patent: Nov. 28, 2000

[54] SENSOR, PARTICULARLY TEMPERATURE SENSOR, AND INJECTION MOLDING APPARATUS FOR THE MANUFACTURE OF A SENSOR

[75] Inventors: Joachim Acht, Frankfurt; Ralf Schimmel, Weilmünster, both of Germany

[73] Assignee: Mannesmann VDO AG, Frankfurt, Germany

[21] Appl. No.: 08/898,500

[22] Filed: Jul. 22, 1997

[30] Foreign Application Priority Data

Jul. 25, 1996 [DE] Germany ............... 196 29 963

[51] Int. Cl.⁷ ................................................ G01K 7/06
[52] U.S. Cl. ............................................... 73/866.5
[58] Field of Search ........................ 374/208, 173, 374/174, 207.2, 207.3; 73/866.5; 29/858, 855, 856, 595

[56] References Cited

U.S. PATENT DOCUMENTS

| | | |
|---|---|---|
| 4,841,274 | 6/1989 | Yagher, Jr. et al. ............. 374/208 |
| 5,046,857 | 9/1991 | Metzger et al. ................ 374/208 |
| 5,741,072 | 4/1998 | Yamaguchi et al. ............. 374/208 |
| 5,818,224 | 10/1998 | Van Den Berg .................. 29/595 |

FOREIGN PATENT DOCUMENTS

| | | |
|---|---|---|
| 0239459 | 9/1987 | European Pat. Off. . |
| 4117290 | 12/1992 | Germany . |
| 8327464 | 12/1996 | Japan . |

*Primary Examiner*—Robert Raevis
*Attorney, Agent, or Firm*—Martin A. Farber

[57] ABSTRACT

For the manufacture of a sensor (1) having a pre-assemblable transmitter insert (3) with a transmitter element (4) with connecting lines (6, 7), the transmitter insert (3) is first of all fastened on a core of an injection molding apparatus and then introduced into an injection mold. After coating with plastic, the core is pulled out of the sensor (1). A depression (10) remains in the sensor (1).

7 Claims, 3 Drawing Sheets

SENSOR, PARTICULARLY TEMPERATURE SENSOR, AND INJECTION MOLDING APPARATUS FOR THE MANUFACTURE OF A SENSOR

FIELD AND BACKGROUND OF THE INVENTION

The present invention relates to a sensor, in particular a temperature sensor, having a pre-assemblable transmitter insert which is coated by extrusion by an electrically insulating plastic, the insert having a transmitter element intended for the detection of a measurement value, electrical terminals, and electrical connecting elements extending from the transmitter element to the terminals. The invention furthermore relates to an injection molding apparatus having an injection mold and a core which can be moved into the injection mold.

In a known sensor of the above type, the transmitter element is first of all soldered to the connecting lines and then inserted into the injection mold and coated by extrusion with plastic. The regions of the connecting lines which are not to be covered by plastic are, as a rule, held free of the core of the injection molding apparatus and, after the coating of the transmitter insert, they form the terminals of the sensor on which the plug of a connecting line is placed.

The known sensor has the disadvantage that it is expensive to constitute and manufacture. For instance, it is necessary to dimension the connecting lines with a high strength, since otherwise, upon being coated with plastic, the transmitter element can very easily shift to the side from its intended position in the injection mold.

One could think of fastening the transmitter element so as to fix it in its intended position on a holding part which, upon the coating with plastic, rests against the wall of an injection mold. In this way, however, the production of the sensor becomes very expensive. Such an attachment of the holding part, particularly upon series production of the sensor, is very cost-intensive and leads to sensors having a non-homogeneous surface. In order to prevent tilting of the transmitter insert, the holding part, furthermore, must be of very large dimensions.

SUMMARY OF THE INVENTION

The object of the invention is so to develop a sensor of the aforementioned type that it can be produced as economically as possible. Furthermore, an injection molding apparatus with which the sensor can be produced as simply as possible is to be developed.

The first-mentioned problem is solved in accordance with the invention in the manner that the sensor has at least one depression which extends from the terminals up to the transmitter element or up to a holding part which holds the transmitter insert closer to the transmitter element.

By this development, the sensor requires particularly little plastic for its manufacture so that the cost for its material is particularly slight and it can therefore be produced at favorable cost. The depression in the sensor is produced upon the coating of the transmitter insert from the core of the injection molding apparatus. The transmitter insert is thus supported by the core so that movement of the transmitter element towards one side can be substantially avoided. Furthermore, the sensor is particularly light in weight as a result of the depression so that, for instance, the sensor when developed as temperature sensor has a short response time. The arrangement of the holding part in the sensor has the advantage that the transmitter element is completely covered by the plastic and is thus protected against corrosion and electric short circuits.

In accordance with one advantageous further development of the invention, the holding part can be particularly easily coated with plastic if it is of U-shape and is arranged with its base facing the transmitter element.

In accordance with another advantageous further development of the invention, the holding part is reliably held in the plastic if it has holes which pass through its base.

In accordance with another advantageous further development of the invention, the holding part is developed in a manner which particularly favors flow if it is ridge-shaped at its base, with flanks descending towards the transmitter element.

In accordance with another advantageous further development of the invention, the holding part can be simply pushed over the connecting lines without any danger of bending of the connecting lines if the holding part has a bore hole and a slot for the passage of the connecting lines of the transmitter element. In this way, the pre-assembling of the transmitter insert is particularly simple.

The second problem, namely the creation of an injection molding apparatus for the manufacture of the sensor having an outer injection mold and a core movable into the outer injection mold is solved in accordance with the invention in the manner that the core is provided on the end thereof extending into the injection mold with a receiver for the force-locked or form-locked attachment of the transmitter element or a holding part which holds the transmitter element.

By this development, the pre-assembled transmitter insert can be fastened in simple manner on the core. The core is ordinarily developed particularly stable as a structural part of the injection mold and thus can hold the transmitter insert particularly securely in its intended position. After the introduction of the core with the transmitter insert into the injection mold and the coating of the transmitter insert and the core with plastic, the core can be simply pulled out of the sensor. In this way, the attachment of the transmitter insert to the core is opened. With connecting lines which are developed particularly stable, the recess in the core can also be developed for the fastening of the transmitter insert to the connecting lines.

The transmitter insert can, in accordance with another advantageous further development of the invention, be fastened in particularly simple manner in the intended position on the core if the core has, for the holding of the transmitter insert, notches which correspond to protruding elevations on the holding part. When the core is pulled out of the sensor, the elevations on the holding part are simply sheared off. These elevations can, for instance, be noses protruding from the holding part.

The connecting lines are additionally held by the core in a predetermined position if the core has receivers for the connecting lines at the ends thereof facing away from the transmitter element. In this way, the ends of the connecting lines which extend out of the sensor are held in a predetermined position for the placing-on of a plug of a signal line.

After the core has been coated with plastic, it can, in accordance with another advantageous further development of the invention, be easily pulled out of the sensor if it is tapered towards its free end.

BRIEF DESCRIPTION OF THE DRAWINGS

With the above and other objects and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
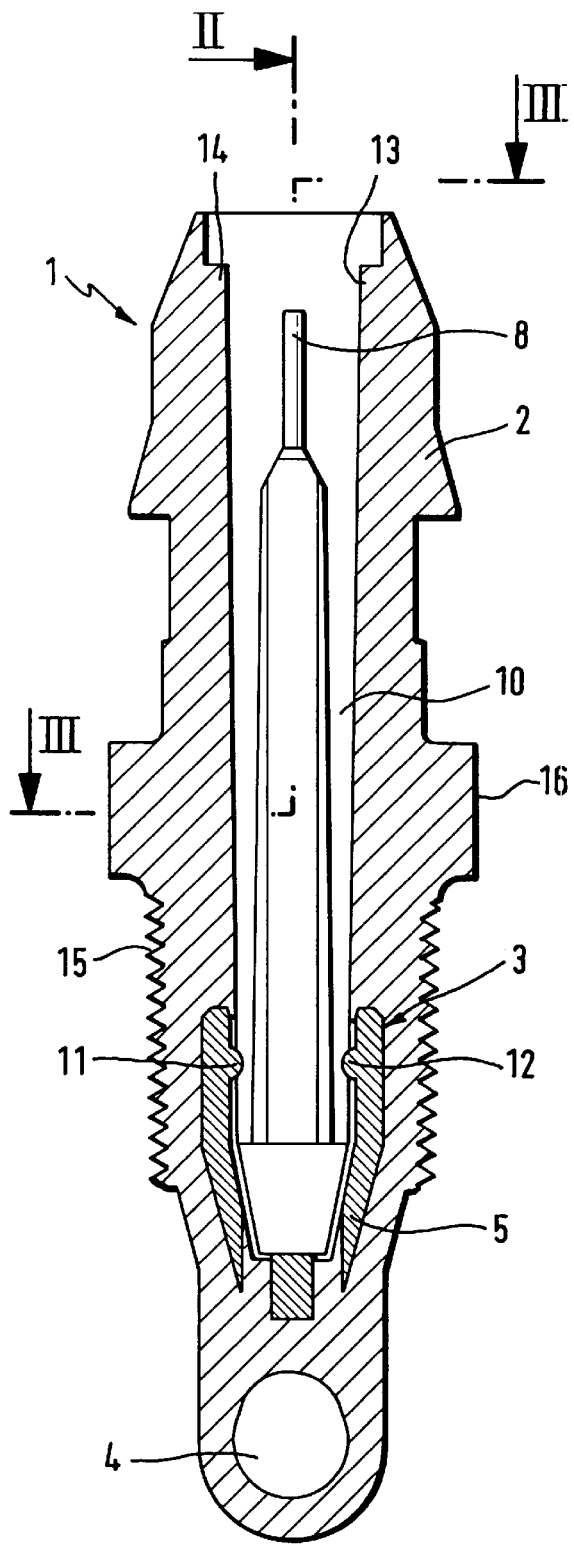
FIG. 1 is a longitudinal section through a sensor in accordance with the invention.
Figure 2:
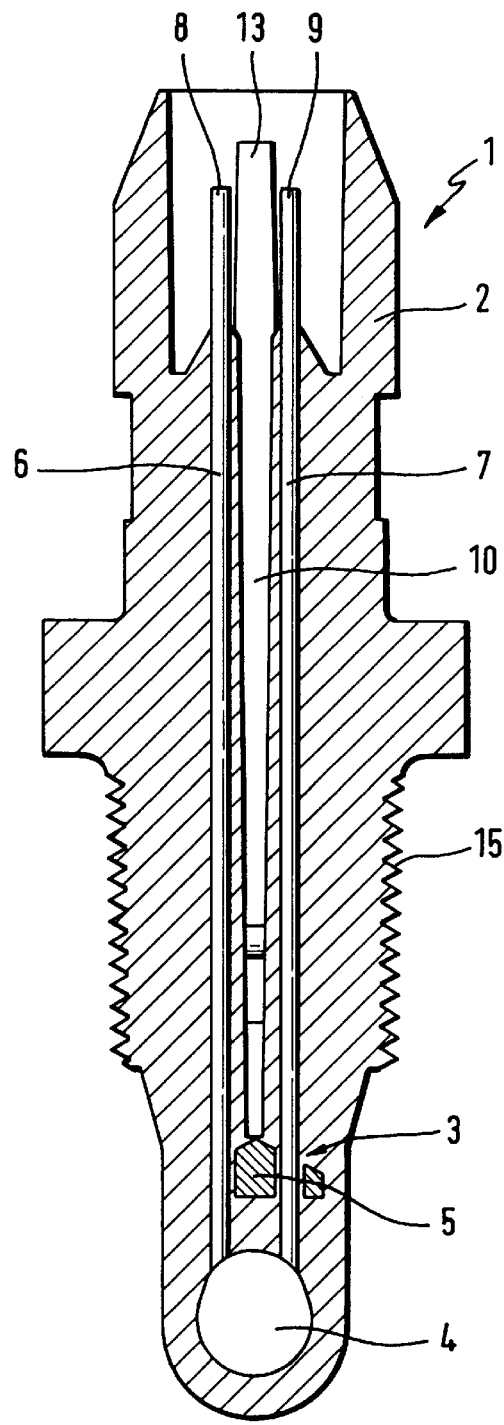
FIG. 2 is a section through the sensor of FIG. 1 along the line II—II.

Each of FIGS. 1 and 2 shows, in longitudinal section, a sensor 1 developed for measuring a temperature. The sensor 1 has a transmitter insert 3 within a plastic covering 2. The transmitter insert 3 is a structural unit which can be preassembled from a transmitter element 4, a holding part 5 and two connecting lines 6, 7. The connecting lines 6, 7 extend at one end of the sensor 1 out of the plastic covering 2 and form terminals 8, 9 on which a plug (not shown) of a signal line can be placed. The transmitter element.4 is contained completely within the plastic covering 2 in the end of the sensor 1 facing away from the terminals 8, 9. At this place, the plastic coating 2 covers the transmitter element 4 with a wall thickness which is relatively thin as compared with the rest of the sensor 1.

From the end of the sensor 1 facing the terminals 8, 9, a depression 10 extends up to the holding part 5. This depression 10 is not filled with plastic and tapers down towards the transmitter element 4. Nose-like elevations 11, 12 on the holding part 5 extend into the lower end of the depression 10.

In the region of the terminals 8, 9, ridges 13, 14 are arranged in the plastic covering 2, they serving to prevent twisting of the plug of the signal line. The plastic covering 2 has an external thread 15 by which the sensor 1 can be fastened to any desired structural part (not shown in the drawing).

Figure 3:
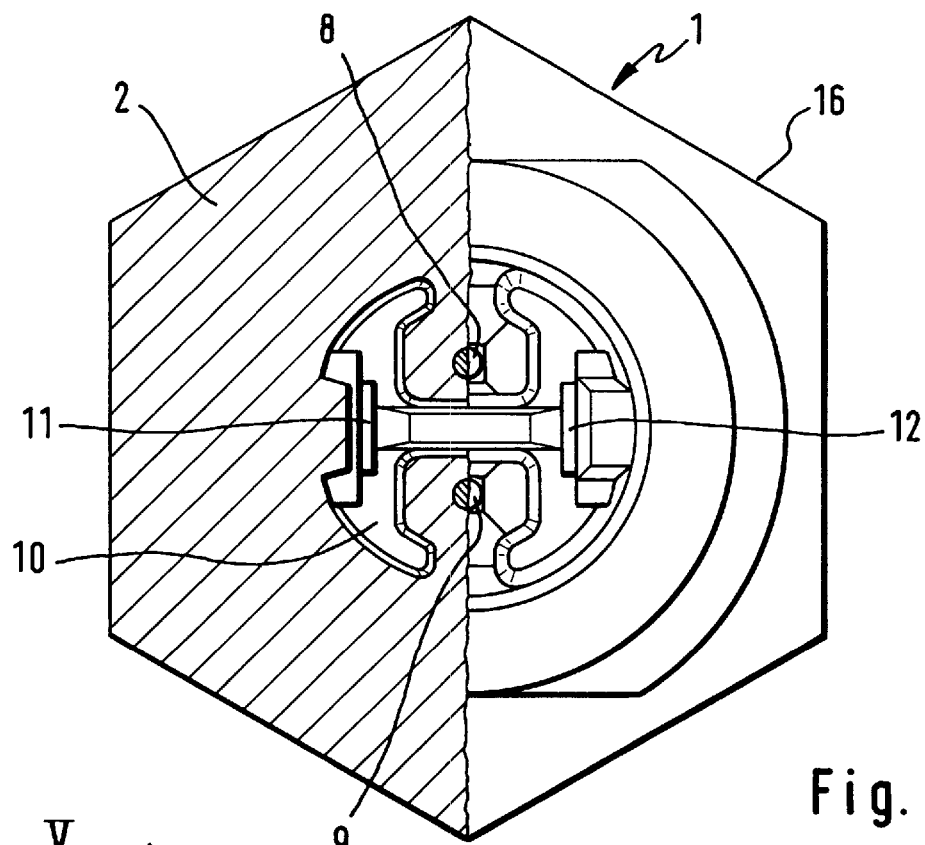
FIG. 3 is a section through the sensor of FIG. 1 along the line III—III.

FIG. 3 shows, in a sectional view along the line III—III, that the sensor has the configuration of a hexagon 16 on its outer side for the attachment of a screwdriver, not shown.

Figure 4:
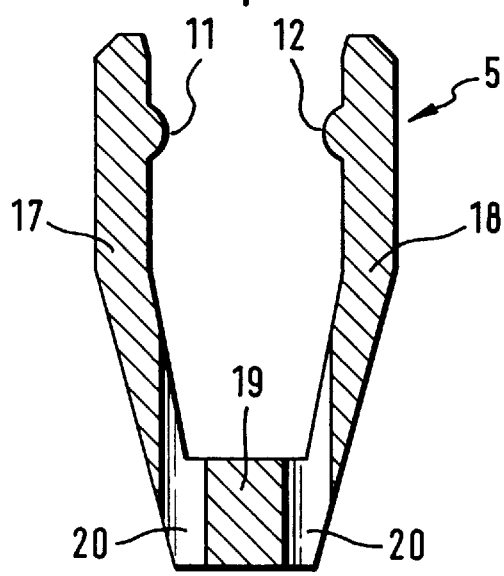
FIG. 4 is a section through a holding part shown in FIG. 1, before the coating with plastic.
Figure 5:
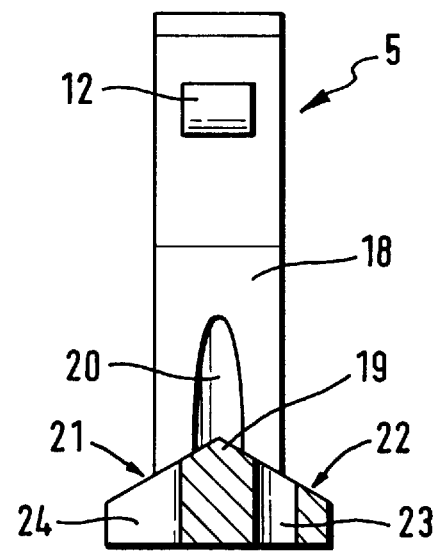
FIG. 5 is a section through the holding part of FIG. 4 along the line V—V.

The holding part 5 of FIG. 1 is shown in FIGS. 4 and 5 before it is covered with plastic. The holding part 5 is U-shaped, with arms 17, 18 and a base 19, and it is passed through in its lower region by holes 20. These holes 20 are filled with plastic, as shown in FIG. 1. The arms 17, 18 of the holding part 5 have the nose-shaped elevations 11, 12 respectively. The base 19 of the holding part 5 is ridge-shaped, with flanks 21, 22 descending downward and it has a hole 23 and a slot 24. The connecting lines 6, 7 are passed through the hole 23 and the slot 24 upon the preassembling of the transmitter insert 3 shown in FIG. 2. The holding part 5 is made of an electrically insulating plastic.

Figure 6:
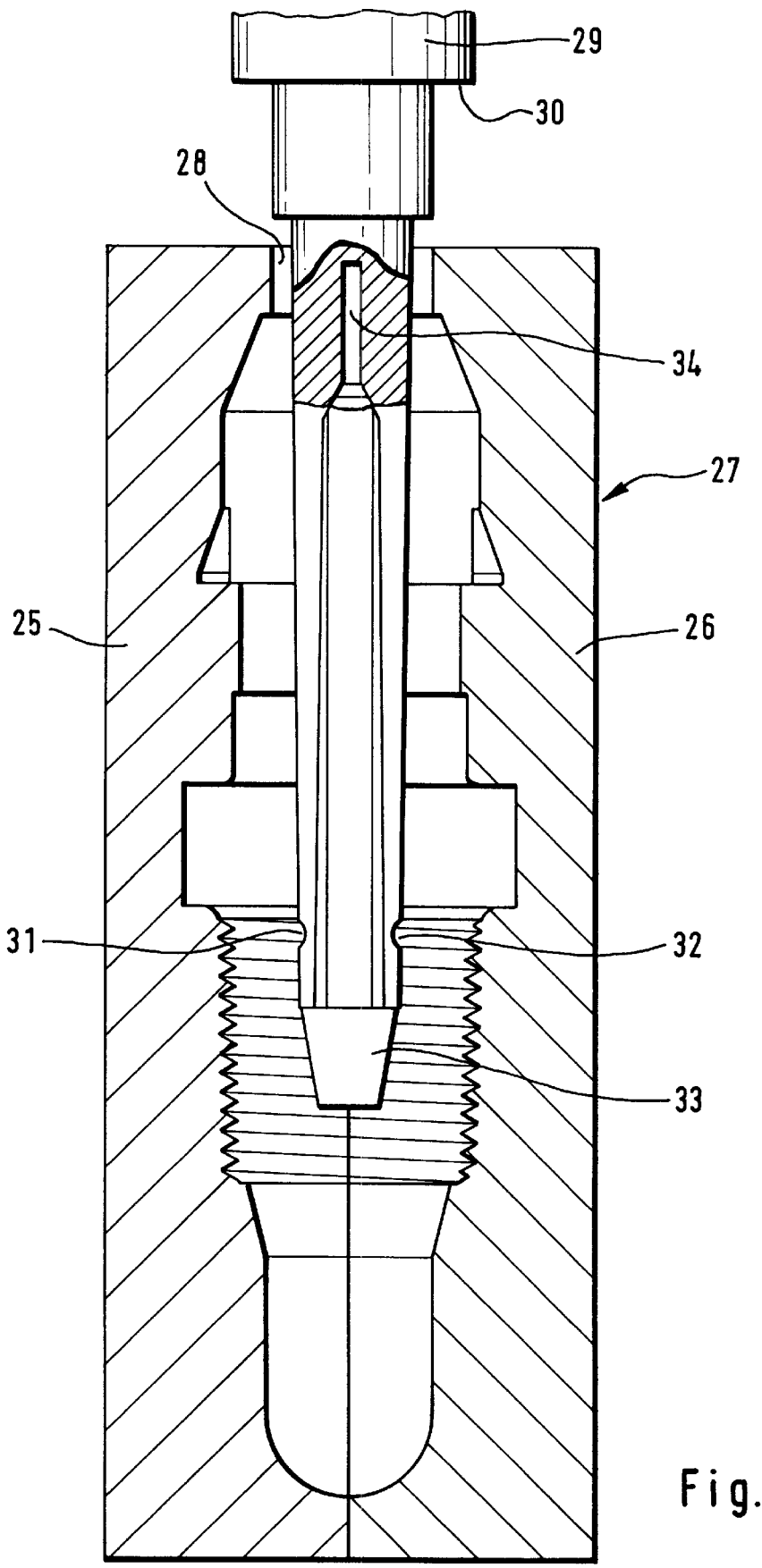
FIG. 6 is a diagrammatic showing of a part of an injection molding apparatus for the production of the sensor of FIG. 1.

FIG. 6 shows a part of an injection molding apparatus having an outer injection mold 27 formed of two shells 25, 26. Through an opening 28 arranged at the upper end the injection mold 27, a movable core 29 can be introduced up to a shoulder 30 developed as a stop. The core has in each case a receiver 34 in the form of a blind hole for the upper ends of the connecting lines 6, 7 shown in FIGS. 1 and 2. On its free end extending into the injection mold 27, the core has two opposite notches 31, 32 and a cone 33. The notches 31, 32 serve for the fastening of the transmitter insert 3 shown in FIG. 1 to the nose-shaped elevations 11, 12 of the holding part 5. The holding part 5 is furthermore centered by the cone 33 of the core 29. In this way, the transmitter insert 3 can be fastened rapidly and dependably on the core 29 and introduced into the injection mold 27. After the transmitter insert 3 has been coated with plastic, the core 29 is pulled out of the sensor 1 and leaves the depression 10 shown in FIGS. 1 and 2.

What is claimed is:

1. A sensor comprising:
    a pre-assemblable transmitter insert coated with a coating of an electrically insulating plastic, the coating having at least one depression
    wherein said insert includes a transmitter element for detection of a measurement value, electric terminals, electric connecting elements leading from said transmitter element to said terminals, and a holding part close to the transmitter element for holding the transmitter insert, said at least one depression extending from said terminals along said electric connecting elements toward said holding part and being located between said electric connecting elements.

2. A sensor according to claim 1, wherein said at least one depression extends to said holding part.

3. A sensor according to claim 1, wherein said at least one depression extends past said holding part to said transmitter element.

4. A sensor according to claim 1, wherein said holding part has a U-shape, and has a base facing said transmitter element.

5. A sensor according to claim 4, wherein said holding part has holes extending through its base.

6. A sensor according to claim 4, wherein, in said holding part, said base has a ridge shape with flanks descending towards said transmitter element.

7. A sensor according to claim 1, wherein said holding part comprises a bore hole and a slot for passage of said connecting elements to said transmitter element.

* * * * *